United States Patent
Takahashi et al.

(10) Patent No.: US 7,502,721 B2
(45) Date of Patent: Mar. 10, 2009

(54) PRODUCT DESIGN SUPPORT SYSTEM, PRODUCT DESIGN SUPPORT METHOD, AND PROGRAM

(75) Inventors: Susumu Takahashi, Yokohama (JP); Takashi Yanagimoto, Yokohama (JP); Tetsuo Kon, Isehara (JP); Tsuneo Misaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 509 days.

(21) Appl. No.: 10/540,391

(22) PCT Filed: Dec. 26, 2003

(86) PCT No.: PCT/JP03/16885

§ 371 (c)(1),
(2), (4) Date: Jun. 23, 2005

(87) PCT Pub. No.: WO2004/059537

PCT Pub. Date: Jul. 15, 2004

(65) Prior Publication Data

US 2006/0155760 A1    Jul. 13, 2006

(30) Foreign Application Priority Data

Dec. 26, 2002    (JP) .............................. 2002-378108

(51) Int. Cl.
*G06F 17/50* (2006.01)
*G06F 3/00* (2006.01)

(52) U.S. Cl. ............. 703/2; 703/27; 716/1; 716/8; 715/764; 707/3

(58) Field of Classification Search .................. 703/2, 703/27; 716/1, 8; 715/764; 707/3
See application file for complete search history.

(56) References Cited

U.S. PATENT DOCUMENTS

| | | | | |
|---|---|---|---|---|
| 5,812,130 A | * | 9/1998 | Van Huben et al. | 715/764 |
| 6,173,433 B1 | * | 1/2001 | Katoh et al. | 716/1 |
| 6,584,603 B1 | * | 6/2003 | Shibuya | 716/8 |
| 6,957,186 B1 | * | 10/2005 | Guheen et al. | 705/1 |
| 7,071,952 B1 | * | 7/2006 | Ternulf et al. | 345/629 |

FOREIGN PATENT DOCUMENTS

| | | |
|---|---|---|
| JP | 08-314996 | 11/1996 |
| JP | 2002-099583 | 4/2002 |
| JP | 2002-099591 | 4/2002 |
| JP | 2002-157294 | 5/2002 |
| JP | 2002-157504 | 5/2002 |

* cited by examiner

Primary Examiner—Thai Phan
(74) Attorney, Agent, or Firm—Morrison & Foerster LLP

(57) ABSTRACT

A product design support system comprises a product design support server (1), a product design support database (2) where parts information, parts image information, circuit information and circuit image information are stored, a communication network (3) and a designer terminal (4) connected via the communication network (3). The product design support server (1) allows a designer to specify a predetermined circuit from circuits stored in the product design support database (2). When the predetermined circuit is specified, the product design support server (1) transmits at least one of circuit information or circuit image information of the specified circuit to the designer terminal (4) via the communication network (3) to provide the designer with the transmitted information. In case of newly designing a circuit, a circuit or parts satisfying the specification designated by the designer are specified through simulation or the like, and the designer is provided with information on the specified circuit or the like.

35 Claims, 13 Drawing Sheets

DESIGNER INFORMATION DB

| DESIGNER ID | NAME | BELONGING | PASSWORD | ...... |
|---|---|---|---|---|
| 001 | ICHIRO RIKO | FIRST DESIGN | 123... | ...... |
| . | . | . | . | . |
| . | . | . | . | . |
| . | . | . | . | . |

FIG. 4

PARTS INFORMATION DB

| PART NAME | PART ID | MAKER NAME | PROVIDING COMPANY NAME | PRICE | ...... |
|---|---|---|---|---|---|
| B | B0001 | X COMPANY | Y COMPANY | 20 YEN | ...... |
| . | . | . | . | . | . |
| . | . | . | . | . | . |
| . | . | . | . | . | . |

FIG. 5

CIRCUIT INFORMATION DB

| CIRCUIT ID | CIRCUIT NAME | DESIGNER ID | MAKER NAME | USED PART ID | ...... |
|---|---|---|---|---|---|
| K0001 | K | 001 | Z COMPANY | B0001 | ...... |
| | | | | B0002 | ...... |
| | | | | . . . | . . . |
| . . . . | . . . . | . . . . | . . . . | . . . . | . . . . |

LOG-IN SCREEN

LOG-IN NAME  _____

PASSWORD  _____

[ SEND ]    [ CLEAR ]

FIG. 8

MENU SCREEN

[ REGISTER PARTS ]    [ REGISTER CIRCUIT ]

[ REGISTER ACHIEVEMENT ]    [ DESIGN CIRCUIT ]

REGISTRATION SCREEN

CIRCUIT ID　　　　_____

CIRCUIT NAME　　　_____

DESIGNER NAME　　　_____

．　　　　　　　　．
　　　　　．　　　　　　　　．
　　　　　．　　　　　　　　．
　　　　　．　　　　　　　　．

[ REGISTER ]　　　[ CLEAR ]

FIG. 11

CIRCUIT DESIGN SCREEN

USE EXISTING
　　INFORMATION　　　[ USE CIRCUIT DIAGRAM ]

[ USE PARTS TABLE ]

USE NO EXISTING
　　INFORMATION　　　　　　[ NEW ]
　　　　．　　　　　　　　．
　　　　．　　　　　　　　．
　　　　．　　　　　　　　．

FIG. 12

```
RETRIEVAL SCREEN

RETRIEVAL KEYS    CIRCUIT DIAGRAM   _____
                  MAKER NAME        _____
                  USED PART NAME    _____
                         .                .
                         .                .
                         .                .

[ RETRIEVE ]      [ CLEAR ]
```

CIRCUIT DIAGRAM

PARTS TABLE

| CIRCUIT ID | DESIGNER ID | USED PART NAME | USED PART ID | ... |
|---|---|---|---|---|
| K0001 | 001 | A | A0001 | ... |
|  |  | B | B0001 | ... |
|  |  | C | C0001 | ... |
|  |  | ... | ... | ... |

SPECIFICATION DESIGNATING SCREEN

CIRCUIT FUNCTIONS     _____

CONSUMED POWER     _____

DELAY TIME     _____

.    .
    .    .
    .    .

[ DESIGNATE ]      [ CLEAR ]

FIG. 18

PRODUCT DESIGN SUPPORT SYSTEM, PRODUCT DESIGN SUPPORT METHOD, AND PROGRAM

TECHNICAL FIELD

The present invention relates to a product design support system, a product design support method and a program that support designing of a product.

BACKGROUND ART

In designing a product, e.g., in designing a circuit, a designer draws a circuit diagram (CAD diagram) using a CAD (Computer Aided Design) system, then selects parts to be used in the drawn circuit.

Selection of parts to be used in a circuit by a designer is carried out in consideration of the specification (spec) of the circuit, such as the performance demanded of the circuit and the size thereof. However, information on parts is often managed individually group by group or section by section, so that there may be a case where a designer has a difficulty in selecting optimal parts. In this respect, there is a system which collectively manages information on parts to facilitate selection of parts by a designer (see, for example, Unexamined Japanese Patent Application KOKAI Publication No. 2002-99591).

In a case where a designer draws a circuit diagram, circuit diagrams already designed are often used. But, information on circuits including circuit diagrams is often managed individually designer by designer or group by group. Therefore, it may not be possible to use circuit diagrams drawn by designers of different groups, for example, bringing about a problem of poor management efficiency.

In designing a circuit, layout of parts should be considered in order to determine optimal positions of parts to be used in the circuit. Consideration of layout of parts requires that detailed circuit diagrams indicating to the pins of which parts the pins of parts constituting a circuit are connected should be drawn for various layouts of the parts, and it should be confirmed that each circuit diagram drawn contains no logical misses. Determining the optimal positions of parts to be used in the circuit is therefore a time-consuming work.

Further, in designing a circuit, restrictions on circuit implementation, e.g., shape limitations, such as a height limitation, and performance limitations, such as a thermal limitation, should be considered in addition to design rules and wiring rules.

DISCLOSURE OF INVENTION

The invention has been made in consideration of the problems, and it is an object of the invention to provide a product design support system and a product design support method which can collectively manage information on a product.

It is another object of the invention to provide a product design support system, a product design support method and a program which can easily design a product.

It is a further object of the invention to provide a product design support system, a product design support method and a program which can easily design a circuit.

To achieve the objects, a product design support system according to the first aspect of the invention supports a user in designing a product and is characterized by having a structure (1, 2) which collectively manages information on a product to facilitate designing of the product or extracts information for making the product compatible with a predetermined specification.

The product design support system may comprise:
storage means (2) including parts-information storage means (22) which stores parts information on parts constituting a product, parts-image-information storage means (23) which stores parts image information on parts stored in the parts-information storage means (22), product-information storage means (24) which stores product information on the product formed by the parts stored in the parts-information storage means (22), and product-image-information storage means (25) which stores product image information on the product stored in the product-information storage means (24);

specification acquisition means (1) which acquires specification information designating a specification of a product to be designed;

compatible-product-information extraction means (1) which extracts from the storage means (2) information on a product compatible with the specification designated by the specification information acquired by the specification acquisition means (1) and/or information on parts to be constituting elements of the product compatible with the specification; and information transmission means (1) which transmits information extracted by the compatible-product-information extraction means (1) to a user terminal (4) of the user, whereby information on a product is collectively managed to facilitate designing of the product.

The compatible-product-information extraction means (1) may select product information on a product having functions designated by the specification information acquired by the specification acquisition means (1), and parts information on parts to be constituting elements of that product from the storage means (2), execute simulation to discriminate whether a product which is obtained by replacing constituting elements of the product indicated by the selected product information compatible with a specification designated by the specification information or not, and extract information on a product compatible with the specification designated by the specification information and/or information on parts to be constituting elements of the product compatible with the specification based on results of the simulation.

The product design support system may comprise:
storage means (2) including parts-information storage means (22) which stores parts information on parts constituting a product, parts-image-information storage means (23) which stores parts image information on parts stored in the parts-information storage means (22), product-information storage means (24) which stores product information on the product formed by the parts stored in the parts-information storage means (22), and product-image-information storage means (25) which stores product image information on the product stored in the product-information storage means (24);

acquisition means (1) which acquires the parts information, the product information and their image information; and update means (1) which updates information stored in the storage means (2) based on the information acquired by the acquisition means (1), whereby information on a product is collectively managed to facilitate designing of the product.

The product design support system may comprise:
parts-information storage means (22) which stores parts information on parts constituting a product;

parts-image-information storage means (23) which stores parts image information on parts stored in the parts-information storage means (22);

product-information storage means (24) which stores product information on the product formed by the parts stored in the parts-information storage means (22);

product-image-information storage means (25) which stores product image information on the product stored in the product-information storage means (24);

restriction information storage means (26) which stores information on a design restriction in product designing; and achievement information storage means (24) which stores achievement information on characteristics of the product stored in the product-information storage means (24), whereby information on a product is collectively managed to facilitate designing of the product.

The achievement information may include physical property values of a product and a manufacturing cost of the product.

The product design support system may further comprise simulation means (1) which simulates characteristics of a designed product based on the achievement information stored in the achievement information storage means (24).

The product design support system may further comprise simulation information transmission means (1) which transmits simulation information on results of simulation done by the simulation means (1) to a user terminal (4) of the user.

The product design support system may comprise:

parts-information storage means (22) which stores parts information on parts constituting a product;

parts-image-information storage means (23) which stores parts image information on parts stored in the parts-information storage means (22);

product-information storage means (24) which stores product information on the product formed by the parts stored in the parts-information storage means (22);

product-image-information storage means (25) which stores product image information on the product stored in the product-information storage means (24);

product specifying means (1) which allows the user to specify a predetermined product from products stored in the product-information storage means (24); and product-information providing means (1) which transmits at least one of the product information stored in the product-information storage means (24) and the product image information stored in the product-image-information storage means (25), for a product specified by the product specifying means (1), to a user terminal (4) of the user to provide the user with the transmitted product-related information, whereby information on a product is collectively managed to facilitate designing of the product.

The product image information stored in the product-image-information storage means (25) may be stored in association with the product information stored in the product-information storage means (24) and the parts image information stored in the parts-image-information storage means (23).

The product specifying means (1) can specify a plurality of products from products stored in the product-information storage means (24).

The product design support system may further comprise:

parts specifying means (4, 1) which allows the user to specify a predetermined product from parts constituting the product specified by the product specifying means (1); and parts-information providing means (1) which transmits at least one of the parts information stored in the parts-information storage means (22) and the parts image information stored in the parts-image-information storage means (23), for a part specified by the parts specifying means (4, 1), to the user terminal (4) of the user to provide the user with the transmitted parts-related information.

The product design support system may further comprise restriction information storage means (26) which stores information on a design restriction in product designing.

The product design support system may further comprise peculiar restriction information storage means (26) which stores information on a peculiar restriction on a predetermined product in product designing.

The product may be an electric circuit, the product information stored in the product-information storage means (24) may include a parts table of the electric circuit, and the product image information stored in the product-image-information storage means (25) may include a circuit diagram.

The product design support system may comprise:

specification acquisition means (1) which acquires specification information designating a specification of a product to be designed;

compatible-product-information extraction means (1) which is connected to an external storage device (2) including a parts-information storage section (22) which stores parts information on parts constituting a product, a parts-image-information storage section (23) which stores parts image information on parts stored in the parts-information storage section (22), a product-information storage section (24) which stores product information on the product formed by the parts stored in the parts-information storage section (22), and a product-image-information storage section (25) which stores product image information on the product stored in the product-information storage section (24), and extracts from the external storage device (2) information on a product compatible with the specification designated by the specification information acquired by the specification acquisition means (1) and/or information on parts to be constituting elements of the product compatible with the specification; and information transmission means (1) which transmits information extracted by the compatible-product-information extraction means (1) to an external user terminal (4) of the user, whereby information on a product is collectively managed to facilitate designing of the product.

The product design support system may comprise:

compatible-product-information extraction means (1) which extracts, from an external storage device (2) including a parts-information storage section (22) which stores parts information on parts constituting a product, a parts-image-information storage section (23) which stores parts image information on parts stored in the parts-information storage section (22), a product-information storage section (24) which stores product information on the product formed by the parts stored in the parts-information storage section (22), and a product-image-information storage section (25) which stores product image information on the product stored in the product-information storage section (24), the parts information, the product information and their image information; and update means (1) which updates information stored in the external storage device (2) based on the information acquired by the acquisition means (1), whereby information on a product is collectively managed to facilitate designing of the product.

The product design support system may comprise:

product specifying means (1) which allows the user to specify a predetermined product from products stored in an external product-information storage device (24) that stores product information on a product to be formed by parts; and product-information providing means (1) which transmits at least one of the product information stored in the external product-information storage device (24) and the product image information stored in an external product-image-information storage device (25) that stores product image information of the product stored in the external product-information storage device (24), for a product specified by the product specifying means (1), to an external user terminal (4) of the user to provide the user with the transmitted product-related information, whereby information on a product is collectively managed to facilitate designing of the product.

A product design support method according to the second aspect of the invention supports a user in designing a product and is characterized by including a step (1, 2) of collectively managing information on a product to facilitate designing of the product or extracting information for making the product compatible with a predetermined specification.

The product design support method may comprise:

a storage step (2) including a parts-information storage step (22) of storing parts information on parts constituting a product, a parts-image-information storage step (23) of storing parts image information on parts stored at the parts-information storage step (22), a product-information storage step (24) of storing product information on the product formed by the parts stored at the parts-information storage step (22), and a product-image-information storage step (25) of storing product image information on the product stored at the product-information storage step (24);

a specification acquisition step (1) of acquiring specification information designating a specification of a product to be designed;

a compatible-product-information extraction step (1) of extracting information on a product compatible with the specification designated by the specification information acquired at the specification acquisition step (1) and/or information on parts to be constituting elements of the product compatible with the specification; and an information transmission step (1) of transmitting information extracted at the compatible-product-information extraction step (1) to a user terminal (4) of the user, whereby information on a product is collectively managed to facilitate designing of the product.

At the compatible-product-information extraction step (1), product information on a product having functions designated by the specification information acquired at the specification acquisition step (1) and parts information on parts to be constituting elements of that product may be selected, simulation to discriminate whether a product which is obtained by replacing constituting elements of the product indicated by the selected product information compatible with a specification designated by the specification information or not may be executed, and information on a product compatible with the specification designated by the specification information and/or information on parts to be constituting elements of the product compatible with the specification based on results of the simulation may be extracted.

The product design support method may comprise:

a storage step (2) including a parts-information storage step (22) of storing parts information on parts constituting a product, a parts-image-information storage step (23) of storing parts image information on parts stored at the parts-information storage step (22), a product-information storage step (24) of storing product information on the product formed by the parts stored at the parts-information storage step (22), and a product-image-information storage step (25) of storing product image information on the product stored at the product-information storage step (24);

an acquisition step (1) of acquiring the parts information, the product information and their image information; and an update step (1) of updating information stored at the storage step (2) based on the information acquired at the acquisition step (1), whereby information on a product is collectively managed to facilitate designing of the product.

The product design support method may comprise:

a parts-information storage step (22) of storing parts information on parts constituting a product;

a parts-image-information storage step (23) of storing parts image information on parts stored at the parts-information storage step (22);

a product-information storage step (24) of storing product information on the product formed by the parts stored at the parts-information storage step (22);

a product-image-information storage step (25) of storing product image information on the product stored at the product-information storage step (24);

a restriction information storage step (26) of storing information on a design restriction in product designing; and an achievement information storage step (24) of storing achievement information on characteristics of the product stored at the product-information storage step (24), whereby information on a product is collectively managed to facilitate designing of the product.

The achievement information may include physical property values of a product and a manufacturing cost of the product.

The product design support method may further include a simulation step (1) of simulating characteristics of a designed product based on the achievement information stored at the achievement information storage step (24).

The product design support method may further include a simulation information transmission step (1) of transmitting simulation information on results of simulation done at the simulation step (1) to a user terminal (4) of the user.

The product design support method may comprise:

a parts-information storage step (22) of storing parts information on parts constituting a product;

a parts-image-information storage step (23) of storing parts image information on parts stored at the parts-information storage step (22);

a product-information storage step (24) of storing product information on the product formed by the parts stored at the parts-information storage step (22);

a product-image-information storage step (25) of storing product image information on the product stored at the product-information storage step (24);

a product specifying step (1) of allowing the user to specify a predetermined product from products stored at the product-information storage step (24); and a product-information providing step (1) of transmitting at least one of the product information stored at the product-information storage step (24) and the product image information stored at the product-image-information storage step (25), for a product specified at the product specifying step (1), to a user terminal (4) of the user to provide the user with the transmitted product-related information, whereby information on a product is collectively managed to facilitate designing of the product.

The product image information stored at the product-image-information storage step (25) may be stored in association with the product information stored at the product-information storage step (24) and the parts image information stored at the parts-image-information storage step (23).

At the product specifying step (1) a plurality of products from products stored at the product-information storage step (24) can be specified.

The product design support method may further include:

a parts specifying step (4, 1) of allowing the user to specify a predetermined product from parts constituting the product specified at the product specifying step (1); and a parts-information providing step (1) of transmitting at least one of the parts information stored at the parts-information storage step (22) or the parts image information stored at the parts-image-information storage step (23), for a part specified at the parts specifying step (4, 1), to the user terminal (4) of the user to provide the user with the transmitted parts-related information.

The product design support method may further include a restriction information storage step (26) of storing information on a design restriction in product designing.

The product design support method may further include a peculiar restriction information storage selected (26) of storing information on a peculiar restriction on a predetermined product in product designing.

The product may be an electric circuit, the product information stored at the product-information storage step (24) may include a parts table of the electric circuit, and the product image information stored at the product-image-information storage step (25) may include a circuit diagram.

A program according to the third aspect of the invention allows a computer to function as a product design support system that supports a user in designing a product and is characterized by having a structure (1, 2) which collectively manages information on a product to facilitate designing of the product or extracts information for making the product compatible with a predetermined specification.

The program may allow the computer to function as a product design support system that supports a user in designing a product and comprises:

storage means (2) including parts-information storage means (22) which stores parts information on parts constituting a product, parts-image-information storage means (23) which stores parts image information on parts stored in the parts-information storage means (22), product-information storage means (24) which stores product information on the product formed by the parts stored in the parts-information storage means (22), and product-image-information storage means (25) which stores product image information on the product stored in the product-information storage means (24);

specification acquisition means (1) which acquires specification information designating a specification of a product to be designed;

compatible-product-information extraction means (1) which extracts from the storage means (2) information on a product compatible with the specification designated by the specification information acquired by the specification acquisition means (1) and/or information on parts to be constituting elements of the product compatible with the specification; and information transmission means (1) which transmits information extracted by the compatible-product-information extraction means (1) to a user terminal (4) of the user, whereby information on a product is collectively managed to facilitate designing of the product.

The program may allow the computer to function as a product design support system that supports a user in designing a product and comprises:

storage means (2) including parts-information storage means (22) which stores parts information on parts constituting a product, parts-image-information storage means (23) which stores parts image information on parts stored in the parts-information storage means (22), product-information storage means (24) which stores product information on the product formed by the parts stored in the parts-information storage means (22), and product-image-information storage means (25) which stores product image information on the product stored in the product-information storage means (24);

acquisition means (1) which acquires the parts information, the product information and their image information; and update means (1) which updates information stored in the storage means (2) based on the information acquired by the acquisition means (1), whereby information on a product is collectively managed to facilitate designing of the product.

The program may allow the computer to function as a product design support system that supports a user in designing a product and comprises:

parts-information storage means (22) which stores parts information on parts constituting a product;

parts-image-information storage means (23) which stores parts image information on parts stored in the parts-information storage means (22);

product-information storage means (24) which stores product information on the product formed by the parts stored in the parts-information storage means (22);

product-image-information storage means (25) which stores product image information on the product stored in the product-information storage means (24);

restriction information storage means (26) which stores information on a design restriction in product designing; and achievement information storage means (24) which stores achievement information on characteristics of the product stored in the product-information storage means (24), whereby information on a product is collectively managed to facilitate designing of the product.

The program may allow the computer to function as a product design support system that supports a user in designing a product and comprises:

parts-information storage means (22) which stores parts information on parts constituting a product;

parts-image-information storage means (23) which stores parts image information on parts stored in the parts-information storage means (22);

product-information storage means (24) which stores product information on the product formed by the parts stored in the parts-information storage means (22);

product-image-information storage means (25) which stores product image information on the product stored in the product-information storage means (24);

product specifying means (1) which allows the user to specify a predetermined product from products stored in the product-information storage means (24); and product-information providing means (1) which transmits at least one of the product information stored in the product-information storage means (24) and the product image information stored in the product-image-information storage means (25), for a product specified by the product specifying means (1), to a user terminal (4) of the user to provide the user with the transmitted product-related information, whereby information on a product is collectively managed to facilitate designing of the product.

BRIEF DESCRIPTION OF DRAWINGS

FIG. 4 is a diagram illustrating the structure of a designer information database.

FIG. 5 is a diagram illustrating the structure of a parts information database.

FIG. 8 is a diagram showing one example of a log-in screen.

FIG. 9 is a diagram showing one example of a menu screen.

FIG. 11 is a diagram showing one example of a registration screen.

FIG. 12 is a diagram showing one example of a circuit design screen.

FIG. 18 is a diagram showing one example of a specification designating screen.

BEST MODE FOR CARRYING OUT THE INVENTION

Figure 1:
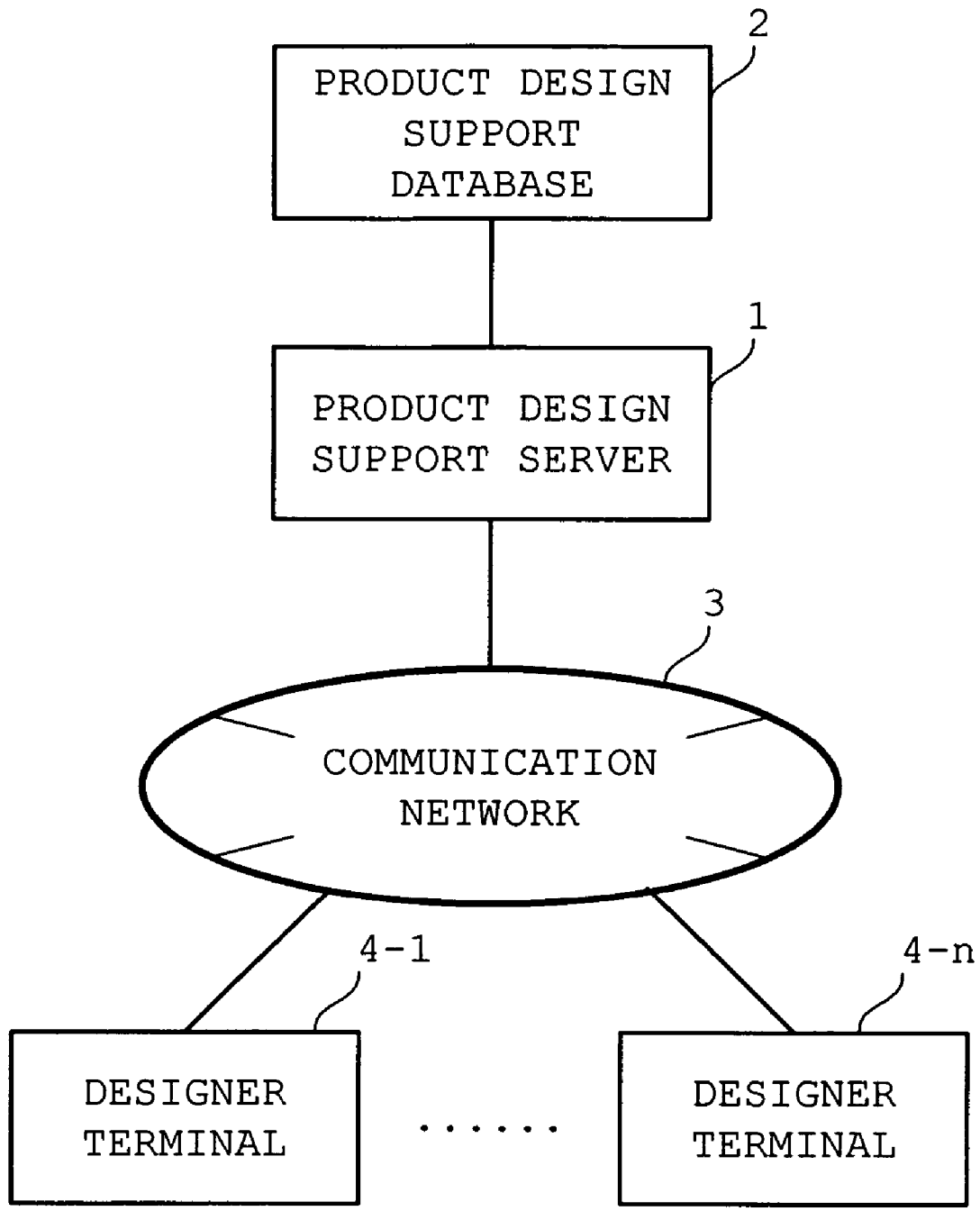
FIG. 1 is a diagram illustrating the structure of a product design support system according to an embodiment of the invention.

The following description of a product design support system and a product design support method according to an embodiment of the invention will be given of a product design support system and a product design support method that support designing an electric circuit. FIG. 1 illustrates the structure of the product design support system according to the embodiment.

As shown in FIG. 1, the product design support system comprises a product design support server 1, a product design support database 2, a communication network 3 and designer terminals 4 (4-1 to 4-n) connected via the communication network 3.

Figure 2:
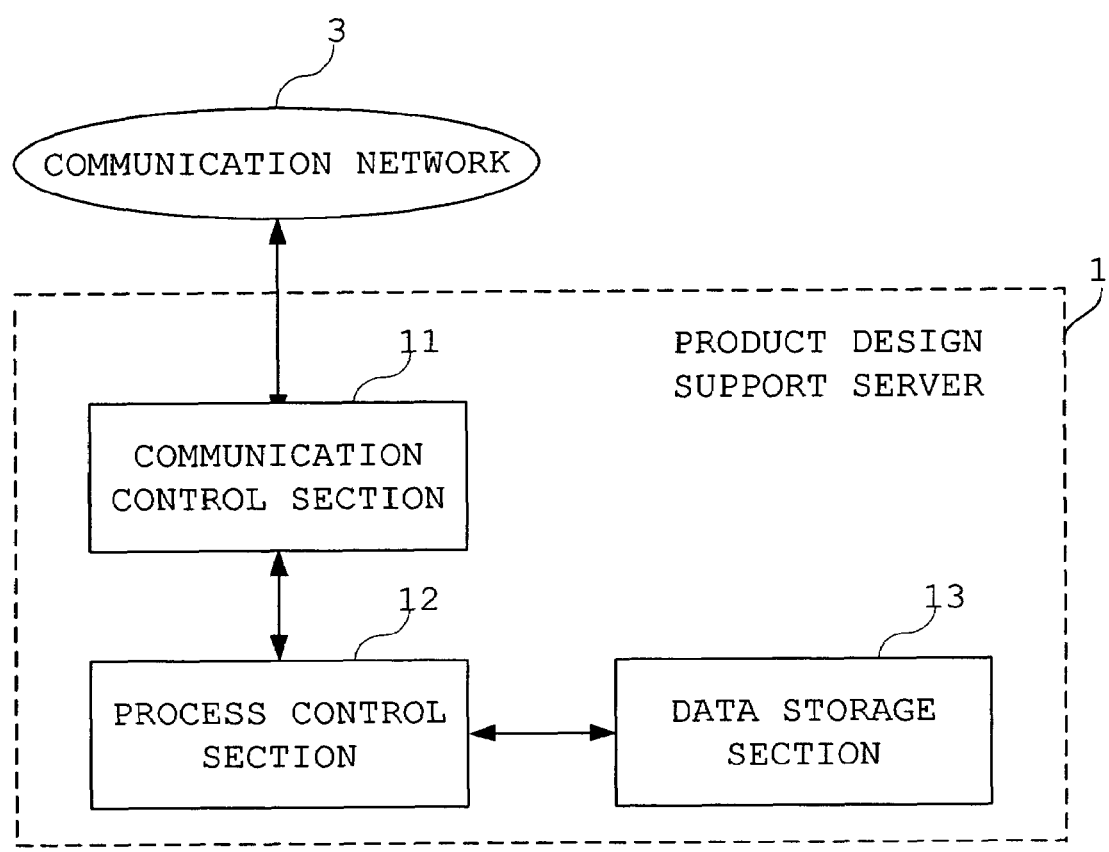
FIG. 2 is a diagram illustrating the structure of a product design support server in FIG. 1.

The product design support server 1 is for doing various processes associated with the product design support system. The product design support server 1 comprises, for example, a CPU (Central Processing Unit) and a semiconductor memory, a magnetic disk recording device, etc. FIG. 2 illustrates the structure of the product design support server 1.

As shown in FIG. 2, the product design support server 1 includes a communication control section 11, a process control section 12 and a data storage section 13. They are realized, for example, as the CPU of the product design support server 1 executes an operation program.

The communication control section 11, which is comprised of, for example, a predetermined communication device, such as a rooter, connects the product design support server 1 to the communication network 3. The communication control section 11 transmits and receives various kinds of data (information) via the communication network 3.

The process control section 12 performs communication via the communication control section 11, and processes various kinds of information. Further, the process control section 12 generates image data.

The data storage section 13, which is comprised of a semiconductor memory, a magnetic disk recording or the like, records various kinds of information and programs.

Figure 3:
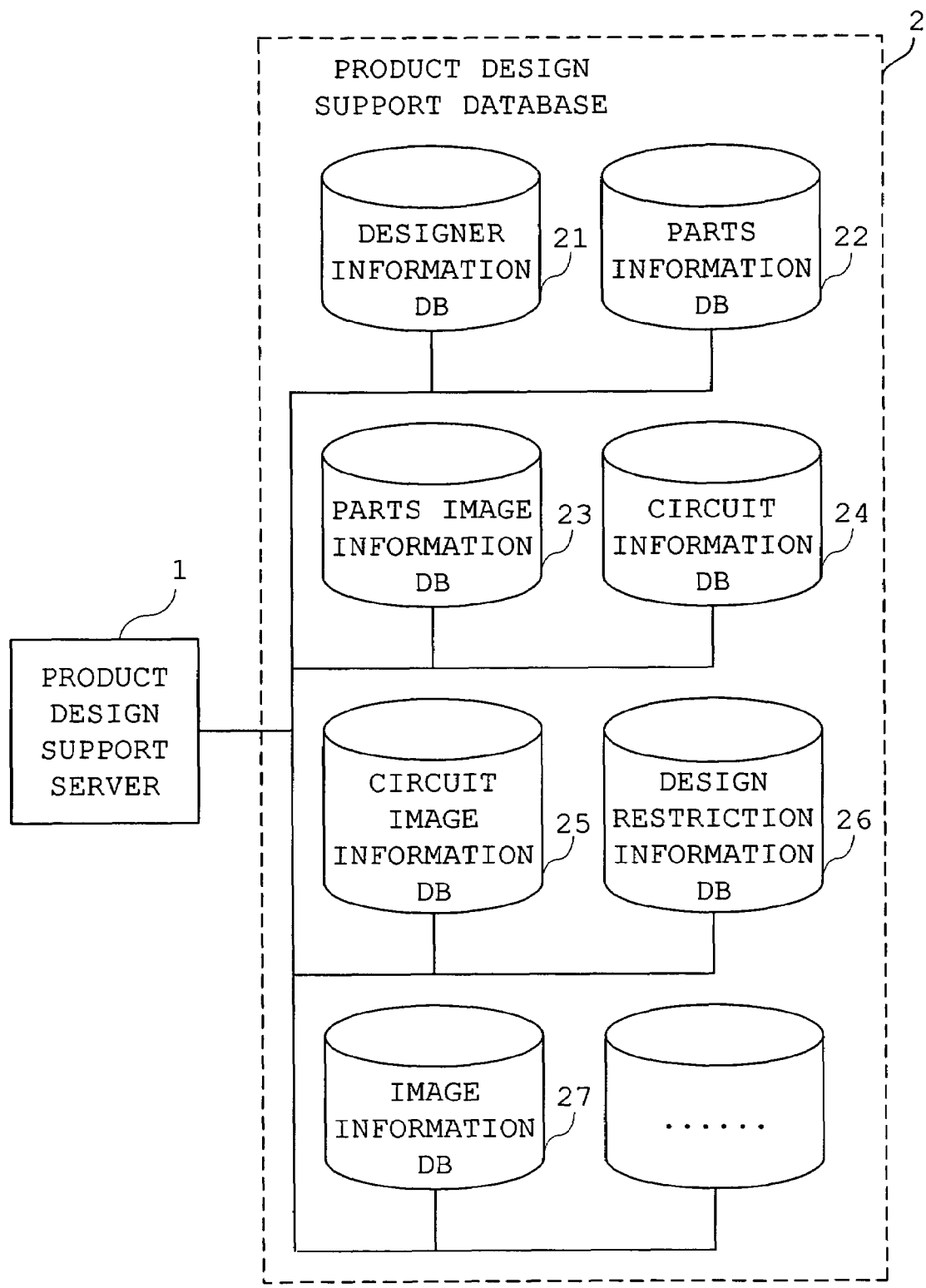
FIG. 3 is a diagram illustrating the structure of a product design support database in FIG. 1.

The product design support database 2 is a database (DB) to store various kinds of information associated with the product design support system. FIG. 3 illustrates the structure of the product design support database 2. As shown in FIG. 3, the product design support database 2 comprises a designer information DB 21, a parts information DB 22, a parts image information DB 23, a circuit information DB 24, a circuit image information DB 25, a design restriction information DB 26, and an image information DB 27.

The designer information DB 21 is a database to store information on a designer who designs a product (circuit) using the product design support system. In the designer information DB 21, for example, a record is created for each designer ID, and a name, a belonging section, a password, etc. are stored in each record, as shown in FIG. 4. The designer ID is identification information of a designer. The password is for a designer to log in the product design support system.

The parts information DB 22 is a database to store information on parts information usable in a circuit. In the parts information DB 22, for example, a record is created for each part classification (part name), and a part ID, a maker namer, a providing company name, a price, the specification of the part (spec), a part image number stored in the parts image information DB 23, etc. are stored in each record, as shown in FIG. 5.

The parts image information DB 23 is a database to store image data or the like of parts. Image data or the like in the parts image information DB 23 is stored in association with the part ID's stored in the parts information DB 22.

Figures 6, 7:
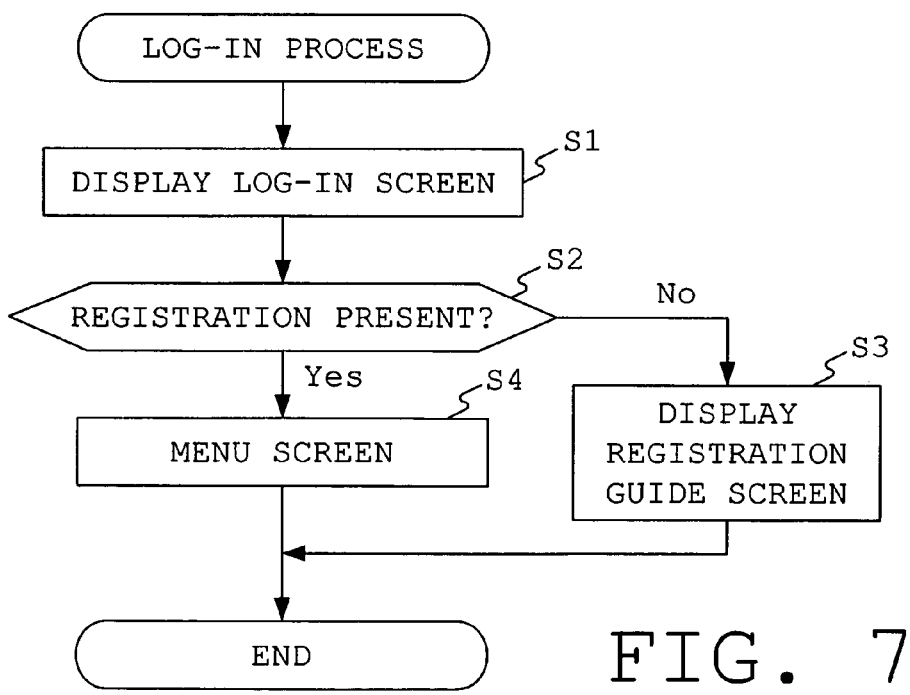
FIG. 6 is a diagram illustrating the structure of a circuit information database.
FIG. 7 is a flowchart for explaining a log-in process.

The circuit information DB 24 is a database to store information on a designed circuit. In the circuit information DB 24, for example, a record is created for each circuit ID, and a circuit name, a designer ID, a maker name, the name of a part used, the layout position, etc. are stored in each record, as shown in FIG. 6. In the used part name, etc., all the parts used in the circuit are stored, and individual records created circuit ID by circuit ID become a list (parts table) of parts used in each circuit. In the circuit information DB 24, information on restrictions determined at the time of designing the circuit, i.e., unique restrictions on the circuit, is stored. As unique restrictions on the circuit, for example, there are shape restrictions, such as a height limitation on the circuit, and performance restrictions, such as a thermal limitation.

As information on a product is collectively managed this way, even circuits designed by different designers can be used in circuit design in a case where a designer draws a circuit diagram.

The circuit image information DB 25 is a database to store image data or the like on a circuit stored in the circuit information DB 24. Image data or the like in the circuit image information DB 25 is stored in association with the circuit ID's stored in the circuit information DB 24.

For instance, image data or the like in the circuit image information DB 25 is formed by the process control section 12 by image data or the like of used parts and layout positions stored in the circuit information DB 24 and parts stored in the parts image information DB 23. Therefore, when a designer changes a parts table through the circuit design process using the parts table to be discussed later (e.g., changes a part to be used in the circuit and its position), the process control section 12 changes information on associated image data or the like to be stored in the circuit image information DB 25. In the embodiment, image data or the like in use is a CAD diagram (circuit diagram) prepared by CAD (Computer Aided Design), and all the parts to be used in the circuit and their positional relationship are illustrated.

The design restriction information DB 26 is a database to store information on restrictions in circuit design. In the design restriction information DB 26, for example, design rules and wiring rules in circuit design are stored. It is therefore possible to perform a check routine to discriminate whether a designed circuit contains a logical miss or not as the product design support server 1 (process control section 12) discriminates whether the designed circuit corresponds to the information on the design restrictions stored in the design restriction information DB 26 or not.

In the design restriction information DB 26, information on unique circuit restrictions stored in the circuit information DB 24 is stored. The unique circuit restrictions about the circuit are determined in the circuit design process to be discussed later. It is therefore possible to discriminate whether the designed circuit meets unique circuit restrictions, such as restrictions on circuit implement, or not as the process control section 12 discriminates whether the designed circuit corresponds to information on the unique circuit restrictions stored in the design restriction information DB 26 or not.

The image information DB 27 is a database to store information which forms various images to be displayed in individual processes to be discussed later, and stores images, various forms and the like of multifarious materials for generating those images.

The communication network 3 is constituted by, for example, the Internet, LAN (Local Area Network), WAN (Wide Area Network), or the like. For example, when the communication network 3 is connected as the Internet to the designer terminals 4 of a plurality of companies, the system becomes a product design support system which is usable among the plural companies, and when the communication network 3 is an in-company LAN, the system becomes an in-company product design support system which connects a plurality of design sections in a company.

The designer terminals 4 (4-1 to 4-*n*) are user terminals which uses the product design support system, and comprise a computer having a communication function, a portable terminal and the like. A browser is installed in the designer terminal 4. In the embodiment, a CAD diagram is used for a circuit diagram and CAD is installed in the designer terminal 4. Through the designer terminal 4, entry of a request to the product design support system by a designer, other operational inputs, etc. are made.

A product design support method using the product design support system constructed in the above manner will be described next. As the product design support method using the product design support system, there are circuit design using the circuit diagrams of a circuit designed already (existing circuit) and circuit design using a parts list (parts table) of an existing circuit. The following will describe pre-registration, log-in to the product design support system, circuit registration, and circuit design (circuit design using a circuit diagram, circuit design using a parts table) in order.

(Pre-Registration)

For a designer to use the product design support system, pre-registration into the product design support system is necessary. The pre-registration of a designer will be discussed below.

A designer sends information, such as the name of the designer and the belonging section, to the product design support server 1 via the communication network 3 to the product design support server 1. When receiving the information on the name of the designer, etc., the process control section 12 of the product design support server 1 issues a designer ID and a password, and sends the designer ID and the password to the designer terminal 4 by, for example, mail. The process control section 12 registers predetermined information, the designer ID and the password transmitted into the designer information DB 21.

(Log-In)

As the designer inputs the ID (log-in name) and password transmitted in pre-registration, the designer can log in the product design support system. The following will describe a case where the designer logs in the product design support system.

As the designer accesses the product design support system from the designer terminal 4 via the communication network 3, the process control section 12 of the product design support server 1 starts a process illustrated in the flowchart in FIG. 7.

First, the process control section 12 reads information on a log-in screen as shown in FIG. 8 (e.g., information in an HTML form) from the image information DB 27, sends it to the designer terminal 4, and displays the log-in screen on the product design support database 2 (step S1). Input fields to enter a log-in name and a password are laid out on the screen.

The designer inputs a log-in name and a password on the screen, and clicks "Send". As the designer inputs the log-in name and the password on the screen and clicks "Send", the entries are notified to the process control section 12 via the communication network 3.

With respect to the notification, the process control section 12 discriminates whether the input information is registered in the designer information DB 21 or not (step S2).

When having discriminated that the input information is not registered in the designer information DB 21 (step S2; No), the process control section 12 sends information on an unillustrated registration guide screen (e.g., an HTML text) to the designer terminal 4, displays the registration guide screen on the designer terminal 4 (step S3), then terminates this process.

When having discriminated that the input information is registered in the designer information DB 21 (step S2; Yes), on the other hand, the process control section 12 reads information on a menu screen (information in an HTML form) as shown in FIG. 9 from the image information DB 27, sends it to the designer terminal 4, displays the menu screen on the designer terminal 4 (step S4), then terminates this process.

As shown in FIG. 9, the menu screen has menu columns, such as "Register Parts" to register parts, "Register Circuit" to register a circuit, "Register Achievement" to register achievements about the characteristics of the circuit, "Design Circuit" to design the circuit, and so forth.

(Circuit Registration)

Figure 10:
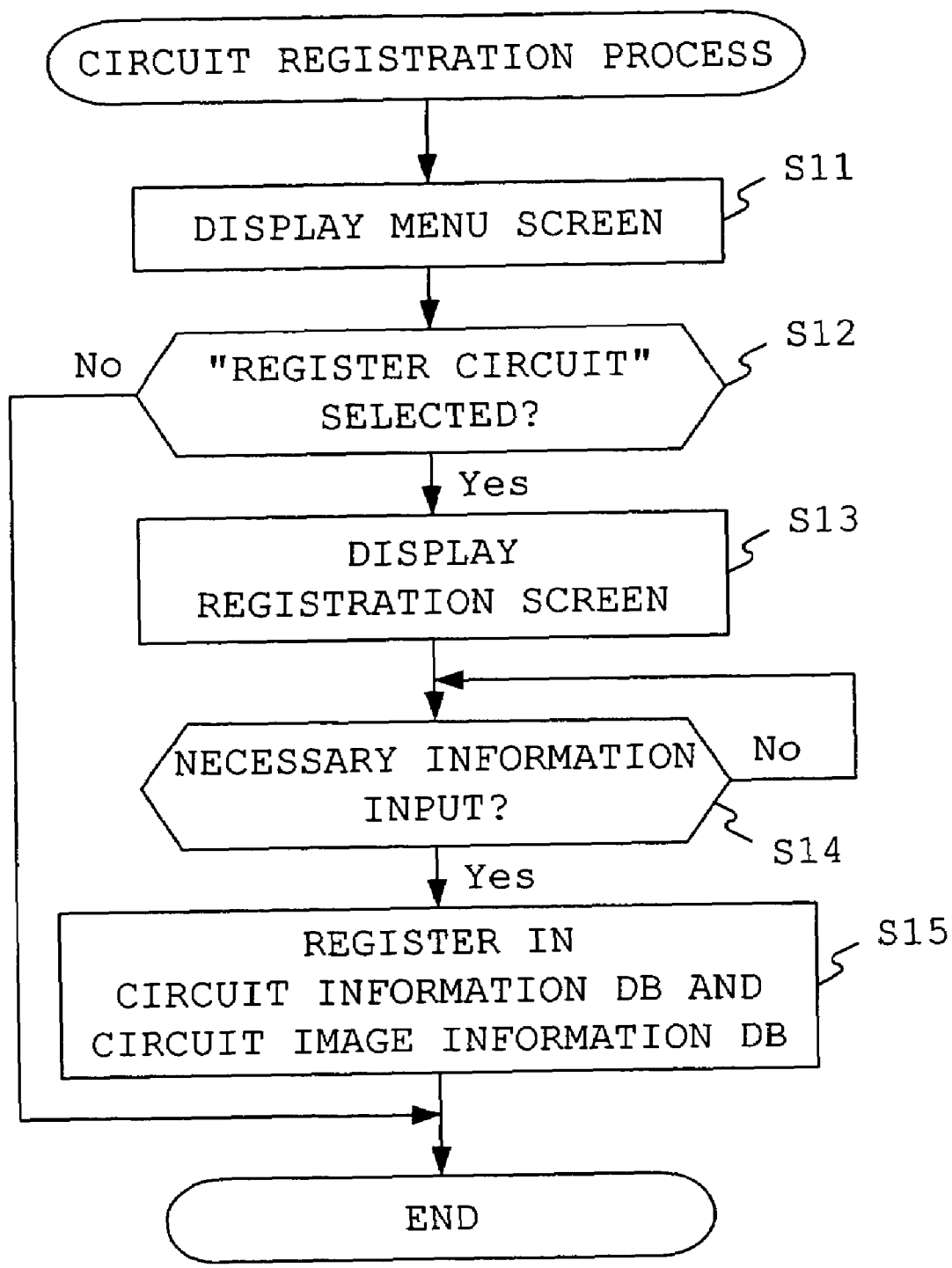
FIG. 10 is a flowchart for explaining a circuit registration process.

Next, a circuit registration process to register the circuit that is designed by a designer will be described referring to the flowchart in FIG. 10.

First, the process control section 12 displays the menu screen shown in FIG. 9 on the designer terminal 4 (step S11). Next, the process control section 12 discriminates whether "Register Circuit" is selected on the menu screen or not (step S12). That is, it is discriminated whether the designer has clicked the "Register Circuit" on the menu screen or not. When having discriminated that the "Register Circuit" has not been clicked (step S12; No), the process control section 12 terminates the process.

When having discriminated that the "Register Circuit" has been clicked (step S12; Yes), the process control section 12 reads information on a registration screen (information in an HTML form) as shown in FIG. 11 from the image information DB 27, sends it to the designer terminal 4, and displays the registration screen on the designer terminal 4 (step S13).

As shown in FIG. 11, input fields to enter a circuit ID, a circuit name, a designer name, etc. are laid out on the registration screen. The designer inputs predetermined conditions in the input fields on the registration screen displayed on the designer terminal 4, and clicks the "Register" key. The designer inputs predetermined conditions in the input fields, and clicks the "Register" key.

Next, the process control section 12 discriminates whether the designer has input necessary information or not (step S14). When having discriminated that the designer has input necessary information (step S14; Yes), the process control section 12 registers the input information in the circuit information DB 24 and the circuit image information DB 25 (step S15), then terminals the process.

In "Register Parts" to register parts, registration is made to the parts information DB 22 and the parts image information DB 23 through procedures similar to those of the circuit registration, and in "Register Achievement" to register achievements about the characteristics of the circuit, registration is likewise made to the circuit information DB 24 through procedures similar to those of the circuit registration. As achievement registration is done this way, the process control section 12 can perform simulation on the characteristics of the designed circuit, such as physical property values, based on achievement information on the circuit registered in the circuit information DB 24. As the process control section 12 sends information on the simulation results to the designer terminal 4, the designer can predict the physical property values of the designed circuit. This can facilitate circuit design. If the physical property values of the designed circuit can be predicted, it becomes easy to consider the layout of parts to determine the optimal positions of the parts to be used in the circuit.

(Circuit Design)

Next, a process about circuit design will be discussed. Circuit design using a circuit diagram and circuit design using a parts table will be discussed in the embodiment.

When the designer selects (clicks) "Design Circuit" on the menu screen displayed on the designer terminal 4, the process control section 12 displays a circuit design screen as shown in FIG. 12. As shown in FIG. 12, laid out on the circuit design screen are menu columns, such as "Use Circuit Diagram" to design a circuit using the circuit diagram of an existing circuit and "Use Parts Table" to design a circuit using a parts list (parts table) of an existing circuit. A menu column "New" to newly perform circuit design without using information on an existing circuit is laid out on the circuit design screen, so that circuit design can be performed newly without using information on an existing circuit. The designer can carry out circuit design using information on an existing circuit by clicking "Use Circuit Diagram" or "Use Parts Table" on the circuit design screen shown in FIG. 12.

(Circuit Design Using Circuit Diagram)

Figure 13:
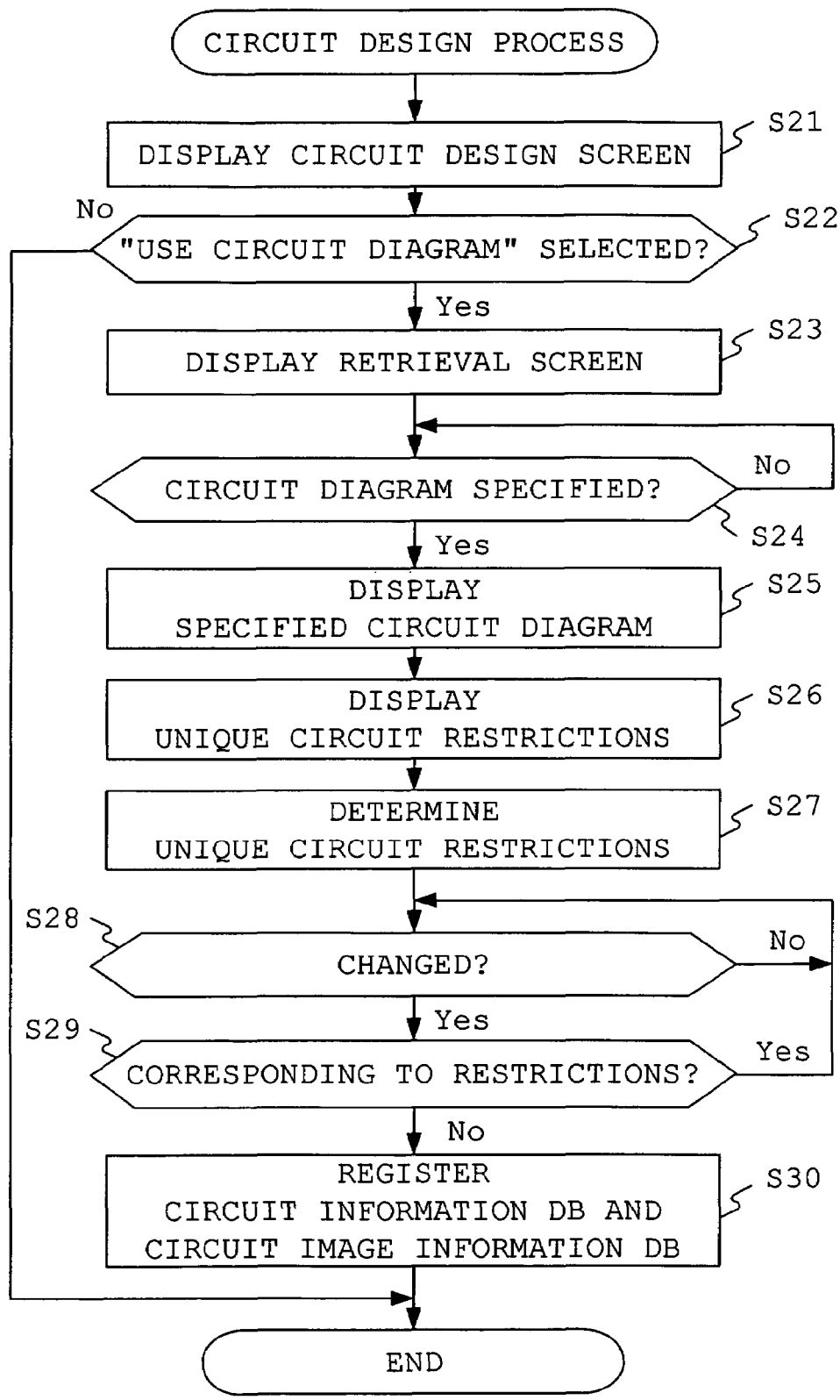
FIG. 13 is a flowchart for explaining a circuit design process using a circuit diagram.

To begin with, a circuit design process with the circuit diagram of an existing circuit used by the designer will be discussed referring to the flowchart in FIG. 13.

First, the process control section 12 displays the circuit design screen as shown in FIG. 12 on the designer terminal 4 (step S21). Next, the process control section 12 discriminates whether "Use Circuit Diagram" is selected (clicked) on the circuit design screen or not (step S22). That is, it is discriminated whether the designer has clicked "Use Circuit Diagram" on the circuit design screen or not. When having discriminated that "Use Circuit Diagram" has not been clicked (step S22; No), the process control section 12 terminates the process.

When having discriminated that "Use Circuit Diagram" has been clicked (step S22; Yes), the process control section 12 reads information on a retrieval screen (information in an HTML form) as shown in FIG. 14 from the image information DB 27, sends it to the designer terminal 4, and displays the retrieval screen on the designer terminal 4 (step S23).

Figures 14, 15A, 15B:
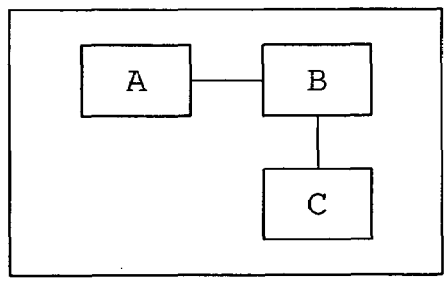
FIG. 14 is a diagram showing one example of a retrieval screen.
FIG. 15A is a diagram exemplarily showing a circuit diagram.
FIG. 15B is a diagram showing a parts table.

As shown in FIG. 14, the retrieval screen has input fields for retrieval keys, such as a circuit name, a maker name and the name of a part to be used, laid out thereon. The designer inputs predetermined conditions in the input fields on the retrieval screen displayed on the designer terminal 4, and clicks the "Retrieve" key. When the designer inputs predetermined conditions in the input fields and clicks the "Retrieve" key, the process control section 12 extracts a circuit corresponding to the predetermined conditions from circuits registered in the circuit information DB 24, sends the extraction results to the designer terminal 4, and displays the extraction results on the designer terminal 4. Accordingly, the designer can retrieve (specify) a circuit (diagram) to be used.

Here, the designer can specify not only one circuit diagram, but can specify a plurality of circuit diagrams. As a plurality of circuit diagrams are specified, it is possible to perform circuit design with a combination of specified circuit diagrams.

Next, the process control section 12 discriminates whether the designer has specified a circuit diagram or not (step S24). When having discriminated that the designer has specified a circuit diagram (step S24; Yes), the process control section 12 reads the specified circuit diagram from the circuit image information DB 25, sends it to the designer terminal 4, and displays the specified circuit diagram on the designer terminal 4 (step S25).

The designer can carry out circuit design using the circuit diagram displayed on the designer terminal 4. In the embodiment, the circuit diagram displayed on the designer terminal 4 is a CAD diagram drawn using CAD. Accordingly, using CAD, the designer can carry out circuit design by making an addition or a change to the circuit diagram displayed on the designer terminal 4.

As the designer changes the circuit diagram in the circuit design process using the circuit diagram, the process control section 12 changes information on parts used in the corresponding circuit, layout positions thereof, and the like. When the designer performs the circuit design process to add a part C to the circuit diagram including a part A and a part B as shown in FIG. 15A, for example, the process control section 12 adds the part C to the corresponding parts table (circuit information DB 24) as shown in FIG. 15B.

As information on circuit diagrams already designed is stored in the circuit image information DB 25 and the circuit information DB 24 and information on the circuit diagrams is collectively managed by the product design support server 1 (process control section 12), the designer can use the circuit diagrams efficiently. Further, circuit design can be carried out using circuit diagrams already designed, so that designing a circuit can be made easier.

The process control section 12 reads information on unique restrictions on the specified circuit from the circuit information DB 24, sends it to the designer terminal 4, and displays the information on the unique restrictions on the designer terminal 4 (step S26). The designer checks if the displayed restrictions are correct, and input correct restrictions when they are wrong. Accordingly, information on unique circuit restrictions in the present circuit design is determined (step S27).

Next, the process control section 12 discriminates whether the designer has done circuit design or not, i.e., whether the circuit diagram is changed or not (step S28). When having discriminated that the circuit diagram is changed (step S28; Yes), the process control section 12 discriminates whether the changed (designed) circuit corresponds to the information on design restrictions stored in the design restriction information DB 26 or not (step S29). That is, the process control section 12 discriminates whether the changed circuit diagram contains a logical miss or not (check routine), and discriminates whether it corresponds to unique restrictions of the circuit diagram itself or not.

When having discriminated that it corresponds to design restrictions (step S29; Yes), the process control section 12 displays (sends) on the designer terminal 4 information to the effect that it corresponds to design restrictions to inform the designer that there is a logical miss, returns to step S28 and requests the designer to perform circuit design again.

Here, information on design rules and wiring rules in circuit design is stored in the design restriction information DB 26. Therefore, it is possible to perform a check routine to discriminate whether the designed circuit contains a logical miss or not by discriminating whether the designed circuit corresponds to information on design restrictions stored in the design restriction information DB 26 or not. This makes it easier to do a work of checking that the designed circuit does not contain a logical miss, and makes it easier to design the circuit. Particularly, the work of determining the optimal positions of the parts to be used in the circuit becomes easier.

Further, information on unique restrictions of a circuit stored in the circuit information DB 24 is stored in the design restriction information DB 26. This makes it possible to discriminate whether unique restrictions of the circuit to be designed are met or not. Therefore, designing of the circuit becomes easier.

When having discriminated that it does not correspond to design restrictions (step S29; No), information on the CAD diagram (image data of the circuit) is registered in the circuit image information DB 25, information on the designed circuit is registered in the circuit information DB 24 (step S30), then the process is terminated.

(Circuit Design Using Parts Table)

Figure 16:
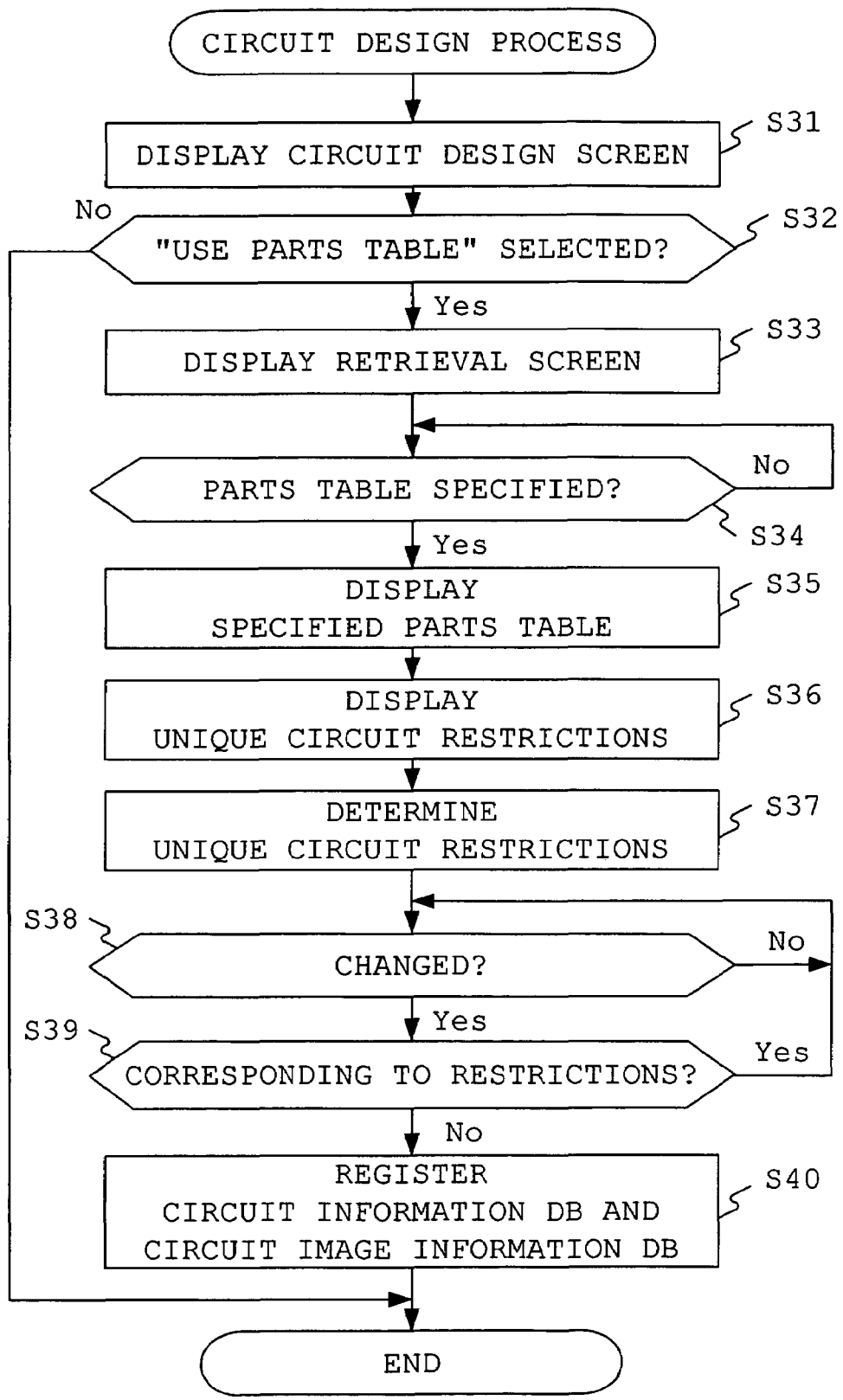
FIG. 16 is a flowchart for explaining a circuit design process using the parts table.

Next, a circuit design process with the parts table of an existing circuit used by the designer will be discussed referring to the flowchart in FIG. 16.

First, the process control section 12 displays the circuit design screen as shown in FIG. 12 on the designer terminal 4 (step S31). Next, the process control section 12 discriminates whether "Use Parts Table" is selected (clicked) on the circuit design screen or not (step S32). That is, it is discriminated whether the designer has clicked "Use Parts Table" on the circuit design screen or not. When having discriminated that "Use Parts Table" has not been clicked (step S32; No), the process control section 12 terminates the process.

When having discriminated that "Use Parts Table" has been clicked (step S32; Yes), the process control section 12 reads information on a retrieval screen (information in an HTML form) as shown in FIG. 14 from the image information DB 27, sends it to the designer terminal 4, and displays the retrieval screen on the designer terminal 4 (step S33).

When the designer inputs predetermined conditions in the input fields on the retrieval screen displayed on the designer terminal 4 and clicks the "Retrieve" key, the process control section 12 extracts a circuit corresponding to the predetermined conditions from circuits registered in the circuit information DB 24, sends the extraction results to the designer terminal 4, and displays the extraction results on the designer terminal 4. Accordingly, the designer can retrieve (specify) the parts table of a circuit to be used.

Next, the process control section 12 discriminates whether the designer has specified a parts table or not (step S34). When having discriminated that the designer has specified a parts table (step S34; Yes), the process control section 12 reads the specified parts table from the circuit information DB 24, sends it to the designer terminal 4, and displays the specified parts table on the designer terminal 4 (step S35).

The designer can carry out circuit design, such as changing parts from the parts table displayed on the designer terminal 4 using the existing parts table. As the designer changes parts or the like shown in the parts table in the circuit design process using the parts table, the process control section 12 changes information on image data or the like of the corresponding circuit.

As information on existing parts tables is stored in the circuit information DB 24, and information on the parts tables is collectively managed by the product design support server 1 (process control section 12), the designer can use the parts tables efficiently. Further, circuit design can be carried out using parts tables already designed, so that designing a circuit can be made easier.

The process control section 12 reads information on unique restrictions on the specified circuit from the circuit information DB 24, sends it to the designer terminal 4, and displays the information on the unique restrictions on the designer terminal 4 (step S36). The designer checks if the displayed restrictions are correct, and input correct restrictions when they are wrong. Accordingly, information on unique circuit restrictions in the present circuit design is determined (step S37).

Next, the process control section 12 discriminates whether the designer has done circuit design or not, i.e., whether the parts table is changed or not (step S38). When having discriminated that the parts table is changed (step S38; Yes), the process control section 12 discriminates whether the changed (designed) circuit corresponds to the information on design restrictions or not (step S39).

When having discriminated that it corresponds to design restrictions (step S39; Yes), the process control section 12 displays (sends) on the designer terminal 4 information to the effect that it corresponds to design restrictions to inform the designer that there is a logical miss, returns to step S38 and requests the designer to perform circuit design again. As it is discriminated whether the designed circuit corresponds to information on design restrictions stored in the design restriction information DB 26 or not, therefore, it is possible to discriminate whether the designed circuit diagram contains a logical miss or not or unique circuit restrictions are met or not, making designing of a circuit easier.

When having discriminated that it does not correspond to design restrictions (step S39; No), information on the designed circuit is registered in the circuit information DB 24, information on image data or the like of the drawn circuit diagram is registered in the circuit image information DB 25 (step S40), then the process is terminated.

(Circuit Design to be Done Newly)

Figure 17:
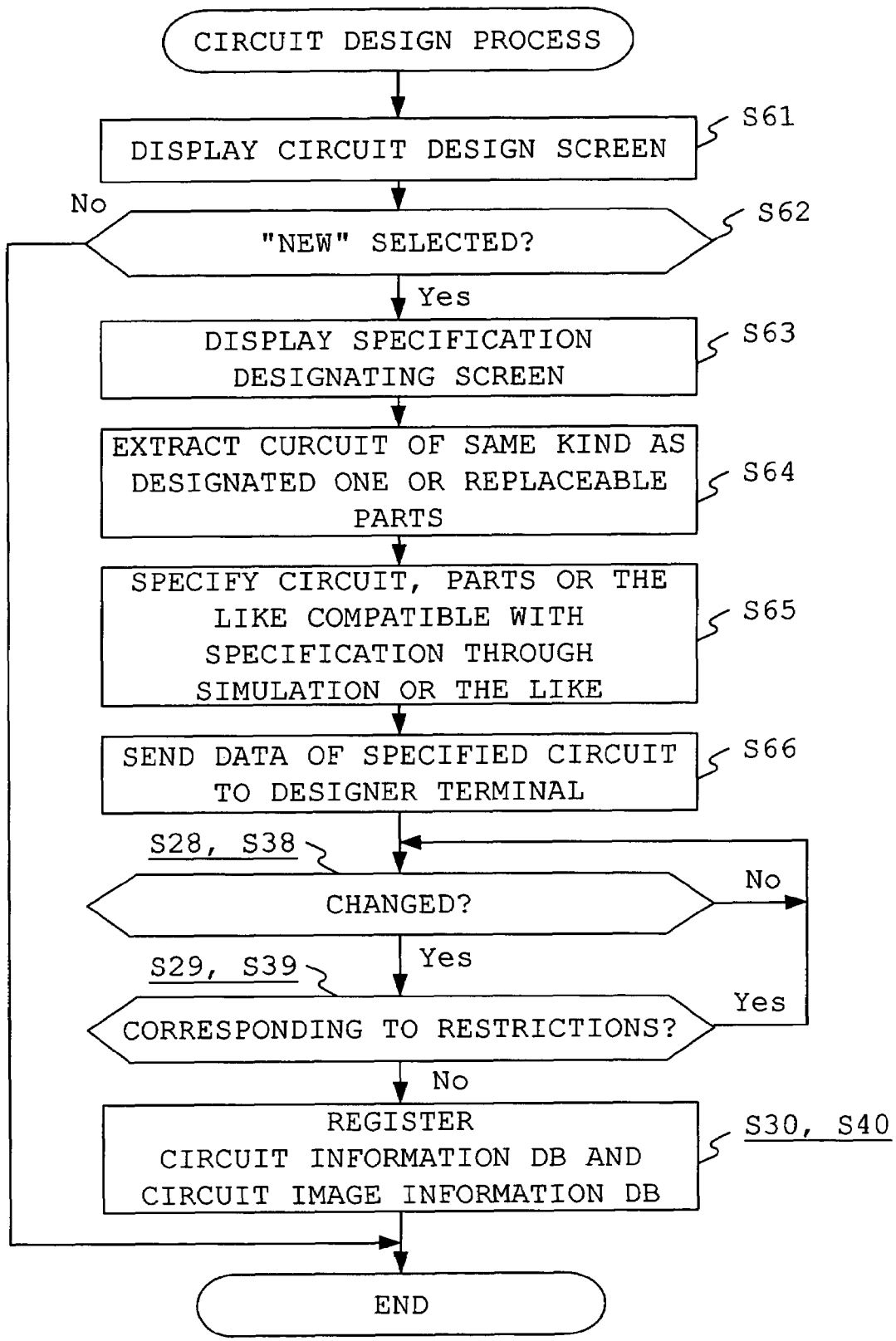
FIG. 17 is a flowchart for explaining a circuit design process in newly designing a circuit.

A circuit design process in case where the designer newly design a circuit with the support of the product design support system will be described next referring to the flowchart in FIG. 17.

First, the process control section 12 displays the circuit design screen shown in FIG. 12 on the designer terminal 4 (step S61). Next, the process control section 12 discriminates whether "New" is selected (clicked) on the circuit design screen or not (step S62). That is, it is discriminated whether the designer has clicked "New" on the circuit design screen or not. When having discriminated that "New" has not been clicked (step S62; No), the process control section 12 terminates the process.

When having discriminated that "New" has been clicked (step S62; Yes), the process control section 12 reads information on a specification designating screen (information in an HTML form) as shown in FIG. 18 from the image information DB 27, sends it to the designer terminal 4, and displays the specification designating screen on the designer terminal 4 (step S63). As shown in FIG. 18, the specification designating screen has input fields for the specification (spec), such as the functions of the circuit and the circuit characteristics, laid out thereon. There are various circuit functions possible, such as logical operations, power supply, amplification and modulation. There are various circuit characteristics possible, such as the input v.s. output characteristics, formulae showing the contents of logical operations, the delay time, consumed power and other restriction conditions.

When the designer input a predetermined specification in the specification designating screen displayed on the designer terminal 4 and clicks "Designate" key, the process control section 12 extracts a circuit having functions similar to the functions designated by the designer from, for example, circuits registered in the circuit information DB 24 (step S64). When the functions designated by the designer are realized by the combination of plural circuits, corresponding plural circuits may be extracted. The process control section 12 searches the parts information DB 22 or the circuit information DB 24 to further extract candidates for parts to be constituting elements of the circuit in place of the parts constituting the previously extracted circuit, based on the circuit characteristics designated by the designer or other specifications. The process control section 12 may extract not only possible substitute parts for the parts, but also a circuit substitutable for parts, or parts or a circuit which is substitutable for a part of the previously extracted circuit.

Next, the process control section 12 simulate an operation for discriminating whether the extracted circuit and various circuits acquired by replacing the parts of the circuit with various candidates are compatible with the specification designated by the designer, and specifies a circuit which is compatible with the specification designated by the designer based on the computed simulation results (step S65). When there are plural corresponding circuits, a circuit which achieves the specification designated by the designer with the greatest allowance (e.g., when consumed power is designated, a circuit with the lowest consumed power among circuits which satisfy all the specifications other than the consumed power) should be specified. When there are no corresponding circuits, a circuit which achieves the specification closest to the one designated by the designer (e.g., a circuit with the minimum width exceeding the designated consumed power) may be specified.

When the circuit that is compatible with the specification designated by the designer is specified, the process control section 12 creates data including image data as data representing the specified circuit, and sends it to the designer terminal 4 (step S66). Then designer terminal 4 displays the circuit represented by the data. the designer terminal 4 may display the parts table of the circuit.

Through the processing in steps S61 to S66, the designer can allow the product design support system to generate a final circuit to be obtained or its interim circuit before editing himself, and can carry out circuit design using the circuit (and/or the parts table of the circuit) whose data has been generated at step S66.

Then, the process control section 12 discriminates whether or not circuit design using the circuit whose data has been sent at step S66 is carried out and the circuit or the parts table of the circuit has been changed (steps S28 and S38). When it is discriminated that the circuit diagram is changed, the processing at and after the step S29 is executed. When it is discriminated that the parts table is changed, the processing at and after the step S39 is executed. It is to be noted that at steps S29 and S39, the process control section 12 performs processing considering that information on the circuit characteristics or the like written in the input fields on the specification designating screen by the designer as information on the unique restrictions of the circuit diagram. At steps S30 and S40, information on the circuit characteristics or the like written in the input fields on the specification designating screen by the designer is stored in the circuit information DB 24 as information on the unique restrictions of the circuit diagram.

According to the embodiment, as explained above, information on circuits already designed is stored in the circuit image information DB 25 and the circuit information DB 24 and information on the circuits is collectively managed by the product design support server 1, the designer can use the existing circuit diagrams or parts tables efficiently. Circuit design can be performed using the existing circuit diagrams or parts tables, making it possible to do circuit design easier.

According to the embodiment, as a final circuit to be acquired which satisfies the conditions or a circuit close to that circuit is automatically generated prior to edition performed by the designer himself even in case where the designer newly designs a circuit, circuit design becomes easier.

According to the embodiment, information on design rules and wiring rules in circuit design is stored in the design restriction information DB 26, so that it is possible to perform a check routine to discriminate whether the designed circuit contains a logical miss or not by discriminating whether the designed circuit corresponds to information on design restrictions stored in the design restriction information DB 26 or not. This makes it easier to do a work of checking that the designed circuit does not contain a logical miss, and makes it easier to design the circuit. Particularly, the work of determining the optimal positions of the parts to be used in the circuit becomes easier.

According to the embodiment, information on unique restrictions of a circuit stored in the circuit information DB 24 is stored in the design restriction information DB 26. This makes it possible to discriminate whether unique restrictions of the circuit to be designed are met or not. Therefore, designing of the circuit becomes easier.

The invention is not limited to the embodiment, but can be modified and adapted in various forms. For instance, the system configuration and the screen structure can be changed as needed. The processing procedures or the like can be changed as needed if substantially the same functions can be achieved.

Although the description of the embodiment of the invention has been given of a case where information on unique circuit restrictions is stored in the circuit information DB 24, information on unique circuit restrictions may not be stored in the circuit information DB 24. The design restriction information DB 26 may not be provided in the product design support database 2 and a check routine to discriminate whether the designed circuit contains a logical miss or not may not be executed. As information on circuits is collectively managed by the product design support server 1 even in those cases, the designer can efficiently use existing circuit diagrams or parts tables.

Although the description of the product design support system of the invention according to the embodiment has been given of a case where a product is a circuit, the target for design support according to the invention has only to be a product comprising a plurality of parts, and is not limited to a circuit.

The product design support system according to the embodiment of the invention can be achieved by not only an exclusive system, but also by using an ordinary computer system. For example, the product design support system that executes the above-described processes can be constructed by installing programs for executing the above-described processes into a general-purpose computer from a recording medium (flexible disk, CD-R or the like) where the programs are stored.

Means for supplying the programs is arbitrary. They may be supplied not only via a predetermined recording medium as mentioned above, but also via a communication circuit, a communication network, a communication system or the like, for example. In this case, for example, the program may be presented on the bulletin board system (BBS) and may be superimposed on a carrier wave over a network. Then, the above-described processes can be executed by activating the program provided this way and running the program under the control of the OS in the way other application programs are run.

The contents of Japanese Patent Application No. 2002-378108 filed with the Japanese Patent Office on Dec. 26, 2002 are included in the specification by reference.

The invention claimed is:

1. A product design support system that supports a user in designing a product, said system comprising:
   storage means for storing information about products; and
   processing means for receiving a predetermined specification of a product to be designed and for selectively extracting said information about said products from said storage means based on compatibility with said specification of said product to be designed,
   said storage means including:
      parts-information storage means which stores parts information on parts constituting a product,
      parts-image-information storage means which stores parts image information on said parts stored in said parts-information storage means,
      product-information storage means which stores product information on said products, said products formed by said parts stored in said parts-information storage means, and
      product-image-information storage means which stores product image information on said products stored in said product-information storage means, and
   said processing means including:
      specification acquisition means which acquires specification information designating said specification of said product to be designed,
      compatible-product-information extraction means which extracts from said storage means said information on said products compatible with said specification designated by said specification information acquired by said specification acquisition means and/or information on parts to be constituting elements of said products compatible with said specification, and
      information transmission means which transmits information extracted by said compatible-product-information extraction means to a user terminal of said user,
   wherein said system collectively manages information on said product to be designed to facilitate designing of said product.

2. The product design support system according to claim 1, wherein said compatible-product-information extraction means
   selects product information on said products having functions designated by said specification information acquired by said specification acquisition means, and parts information on parts to be constituting elements of said products from said storage means,
   executes simulation to discriminate whether a product which is obtained by replacing constituting elements of said products indicated by said selected product information is compatible with said specification designated by said specification information or not, and
   extracts information on said products compatible with said specification designated by said specification information and/or information on parts to be constituting elements of said products compatible with said specification based on results of said simulation.

3. The product design support system that supports a user in designing a product according to claim 1,
   said processing means further including:
      acquisition means which acquires said parts information, said product information, said parts image information, and said product image information, and
      update means which updates information stored in said storage means based on said information acquired by said acquisition means.

4. The product design support system that supports a user in designing a product according to claim 1, said storage means further comprising:
   restriction information storage means which stores information on a design restriction in product designing; and
   achievement information storage means which stores achievement information on characteristics of said products stored in said product-information storage means.

5. The product design support system according to claim 4, wherein said achievement information includes physical property values of said products and manufacturing costs of said products.

6. The product design support system according to claim 4, said processing means further comprising simulation means which simulates characteristics of said product to be designed based on said achievement information stored in said achievement information storage means.

7. The product design support system according to claim 6, said processing means further comprising simulation information transmission means which transmits simulation information on results of simulation done by said simulation means to a user terminal of said user.

8. The product design support system according to claim 4, said storage means further comprising peculiar restriction information storage means which stores information on a peculiar restriction on a predetermined product in product designing.

9. The product design support system that supports a user in designing a product according to claim 1,
said processing means further comprising:
product specifying means which allows said user to specify a predetermined product from said products stored in said product-information storage means, and
product-information providing means which transmits at least one of said product information stored in said product-information storage means and said product image information stored in said product-image-information storage means, for said product specified by said product specifying means, to a user terminal of said user to provide said user with said transmitted product-related information.

10. The product design support system according to claim 9, wherein said product image information stored in said product-image-information storage means is stored in association with said product information stored in said product-information storage means and said parts image information stored in said parts-image-information storage means.

11. The product design support system according to claim 9, wherein said product specifying means can specify a plurality of products from said products stored in said product-information storage means.

12. The product design support system according to claim 9, said processing means further comprising:
parts specifying means which allows said user to specify a predetermined part from said parts constituting said product specified by said product specifying means; and
parts-information providing means which transmits at least one of said parts information stored in said parts-information storage means and said parts image information stored in said parts-image-information storage means, for said part specified by said parts specifying means, to said user terminal of said user to provide said user with said transmitted parts-related information.

13. The product design support system according to claim 9, said storage means further comprising restriction information storage means which stores information on a design restriction in product designing.

14. The product design support system according to claim 1, wherein said product is an electric circuit,
said product information stored in said product-information storage means includes a parts table of said electric circuit, and
said product image information stored in said product-image-information storage means includes a circuit diagram.

15. A product design support system that supports a user in designing a product, said system comprising:
processing means for receiving a predetermined specification of a product to be designed and for selectively extracting information about products based on compatibility with said specification of said product to be designed,
said processing means comprising:
specification acquisition means which acquires specification information designating said specification of said product to be designed;
compatible-product-information extraction means which
connects to an external storage device including a parts-information storage section which stores parts information on parts constituting a product, a parts-image-information storage section which stores parts image information on said parts stored in said parts-information storage section, a product-information storage section which stores product information on said products, said products formed by said parts stored in said parts-information storage section, and a product-image-information storage section which stores product image information on said products stored in said product-information storage section, and
extracts from said external storage device information on said products compatible with said specification designated by said specification information acquired by said specification acquisition means and/or information on parts to be constituting elements of said product compatible with said specification; and
information transmission means which transmits information extracted by said compatible-product-information extraction means to an external user terminal of said user,
wherein said system collectively manages said information on said product to be designed to facilitate designing of said product.

16. The product design support system that supports a user in designing a product according to claim 15, said processing means further comprising:
acquisition means which acquires, from said external storage device said parts information, said product information, said parts image information, and said product image information; and
update means which updates information stored in said external storage device based on said information acquired by said acquisition means.

17. The product design support system that supports a user in designing a product according to claim 15, said processing means further comprising:
product specifying means which allows said user to specify a predetermined product from said products stored in said product-information storage section; and
product-information providing means which transmits at least one of said product information stored in said product-information storage section and said product image information stored in said product-image-information storage section, for said product specified by said product specifying means, to said external user terminal of said user to provide said user with said transmitted product-related information.

18. A product design support method that supports a user in designing a product, said method comprising:
a storage step of storing information about products;
a receiving step of receiving a predetermined specification of a product to be designed; and
an extraction step of selectively extracting said information about said products based on compatibility with said specification of said product to be designed,
said storage step including:
a parts-information storage step of storing parts information on parts constituting a product,
a parts-image-information storage step of storing parts image information on said parts stored at said parts-information storage step, a product-information storage step of storing product information on said products, said products formed by said parts stored at said parts-information storage step, and a product-image-information storage step of storing product image information on said products stored at said product-information storage step;

said receiving step including:

a specification acguisition step of acquiring specification information designating said specification of said product to be designed; and said extraction step including:

a compatible-product-information extraction step of extracting information on said products compatible with said specification designated by said specification information acquired at said specification acquisition step and/or information on parts to be constituting elements of said products compatible with said specification:

said method further comprising:

an information transmission step of transmitting information extracted at said compatible-product-information extraction step to a user terminal of said user, wherein information on said product to be designed is collectively managed to facilitate designing of said product.

19. The product design support method according to claim 18, wherein said compatible-product-information extraction step comprises:

selecting product information on said products having functions designated by said specification information acquired at said specification acquisition step and parts information on parts to be constituting elements of said products, executing simulation to discriminate whether a product which is obtained by replacing constituting elements of said products indicated by said selected product information is compatible with said specification designated by said specification information or not, and extracting information on said products compatible with said specification designated by said specification information and/or information on parts to be constituting elements of said products compatible with said specification based on results of said simulation.

20. The product design support method that supports a user in designing a product according to claim 18, said method further comprising:

an acquisition step of acquiring said parts information, said product information, said parts image information, and said product image information; and an update step of updating information stored at said storage step based on said information acquired at said acquisition step.

21. The product design support method that supports a user in designing a product according to claim 18, said storage step further comprising:

a restriction information storage step of storing information on a design restriction in product designing; and an achievement information storage step of storing achievement information on characteristics of said products stored at said product-information storage step.

22. The product design support method according to claim 21, wherein said achievement information includes physical property values of said products and manufacturing costs of said products.

23. The product design support method according to claim 21, further including a simulation step of simulating characteristics of said product to be designed based on said achievement information stored at said achievement information storage step.

24. The product design support method according to claim 23, further including a simulation information transmission step of transmitting simulation information on results of simulation done at said simulation step to a user terminal of said user.

25. The product design support method according to claim 21, said storage step further including a peculiar restriction information storage step of storing information on a peculiar restriction on a predetermined product in product designing.

26. The product design support method that supports a user in designing a product according to claim 18, said method further comprising:

a product specifying step of allowing said user to specify a predetermined product from said products stored at said product-information storage step; and a product-information providing step of transmitting at least one of said product information stored at said product-information storage step and said product image information stored at said product-image-information storage step, for said product specified at said product specifying step, to a user terminal of said user to provide said user with said transmitted product-related information.

27. The product design support method according to claim 26, wherein said product image information stored at said product-image-information storage step is stored in association with said product information stored at said product-information storage step and said parts image information stored at said parts-image-information storage step.

28. The product design support method according to claim 26, wherein said product specifying step comprises:

specifying a plurality of products from said products stored at said product-information storage step.

29. The product design support method according to claim 26, further including:

a parts specifying step of allowing said user to specify a predetermined part from parts constituting said product specified at said product specifying step; and a parts-information providing step of transmitting at least one of said parts information stored at said parts-information storage step and said parts image information stored at said parts-image-information storage step, for said part specified at said parts specifying step, to said user terminal of said user to provide said user with said transmitted parts-related information.

30. The product design support method according to claim 26, said storage step further including a restriction information storage step of storing information on a design restriction in product designing.

31. The product design support method according to claim 18, wherein said product is an electric circuit, said product information stored at said product-information storage step includes a parts table of said electric circuit, and said product image information stored at said product-image-information storage step includes a circuit diagram.

32. A program for allowing a computer to function as a product design support system that supports a user in designing a product, said system comprising:

storage means for storing information about products; and processing means for receiving a predetermined specification of a product to be designed and for selectively extracting said information about said products from said storage means based on compatibility with said specification of said product to be designed, said storage means including:

parts-information storage means which stores parts information on parts constituting a product, parts-image-information storage means which stores parts image information on said parts stored in said parts-information storage means, product-information storage means which stores product information on said products, said products formed by said parts stored in said parts-information storage means, and product-image-information storage means which stores product image information on said products stored in said product-information storage means; and said processing means including:

specification acquisition means which acquires specification information designating said specification of said product to be designed, compatible-product-information extraction means which extracts from said storage means information on said products compatible with said specification designated by said specification information acquired by said specification acquisition means and/or information on parts to be constituting elements of said products compatible with said specification, and information transmission means which transmits information extracted by said compatible-product-information extraction means to a user terminal of said user, wherein said system collectively manages information on said product to be designed to facilitate designing of said product.

33. The program according to claim 32 for allowing said computer to function as a product design support system that supports a user in designing a product, said processing means further including:

acquisition means which acquires said parts information, said product information, said parts image information, and said product image information, and update means which updates information stored in said storage means based on said information acquired by said acquisition means.

34. The program according to claim 32 for allowing said computer to function as a product design support system that supports a user in designing a product and said storage means further comprises:

restriction information storage means which stores information on a design restriction in product designing; and achievement information storage means which stores achievement information on characteristics of said products stored in said product-information storage means.

35. The program according to claim 32 for allowing said computer to function as a product design support system that supports a user in designing a product, said processing means further comprising:

product specifying means which allows said user to specify a predetermined product from said products stored in said product-information storage means, and product-information providing means which transmits at least one of said product information stored in said product-information storage means and said product image information stored in said product-image-information storage means, for said product specified by said product specifying means, to a user terminal of said user to provide said user with said transmitted product-related information.

\* \* \* \* \*